Dec. 1, 1964  C. L. SHANO  3,159,781
ALTERNATOR REGULATOR CIRCUIT INCLUDING AN ELECTROMAGNETIC
RELAY HAVING A SINGLE CONTACT
Filed July 21, 1961
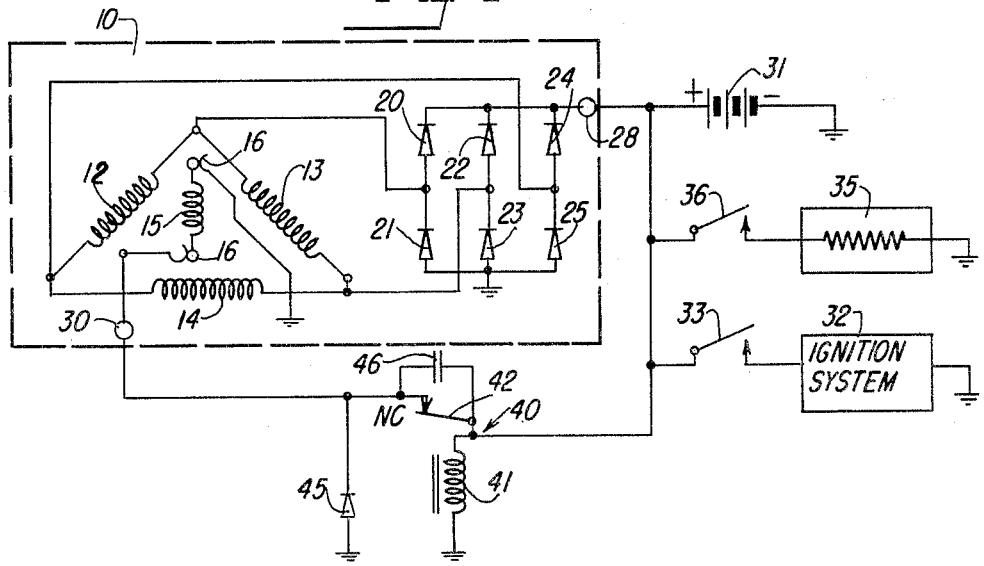
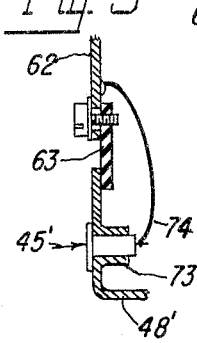
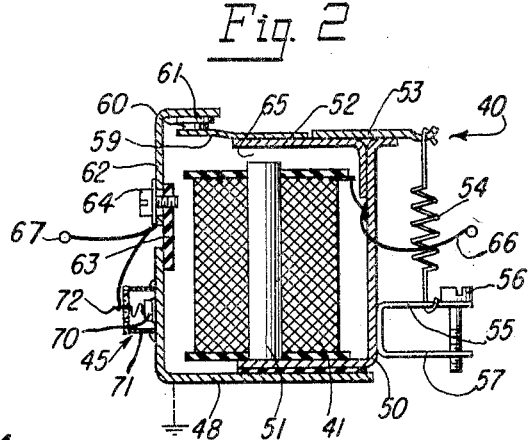
INVENTOR.
CHARLES L. SHANO
BY Mueller & Aichele
ATTYS

United States Patent Office 3,159,781
Patented Dec. 1, 1964

3,159,781
ALTERNATOR REGULATOR CIRCUIT INCLUDING AN ELECTROMAGNETIC RELAY HAVING A SINGLE CONTACT
Charles L. Shano, Chicago, Ill., assignor to Motorola, Inc., Chicago, Ill., a corporation of Illinois
Filed July 21, 1961, Ser. No. 125,745
3 Claims. (Cl. 322—28)

This invention relates to vehicular electrical systems, and more particularly to a regulator circuit for such a system which includes an alternator and rectifiers for providing a direct current voltage.

It has been proposed to use an alternator with rectifiers as the direct current electrical source for an automotive vehicle, in place of a direct current generator which has been commonly used. Such an alternator system has the advantage that greater capacity is provided at low speed operation, as when the automobile engine is idling. This system also has greater capacity at high speed, and because of this it is essential that effective regulation be provided to cut down the alternator voltage when required to prevent damage to the electrical system from the application of excessive voltage.

Voltage regulator circuits have been utilized including a relay device of the vibratory electromagnetic type having contacts which operate to selectively connect a resistor in series with the field coil of the alternator when the voltage exceeds a certain value to thereby reduce the alternator field and the alternator voltage. Such a system may be adequate for regulating a direct current generator wherein the capacity is not limited. However, an alternator having the high capacity required under certain conditions may not have its output reduced adequately by the connection of a series resistor in its field circuit. To overcome this problem, electromagnetic vibratory devices have been used having a normally closed or forward contact for supplying current to the alternator field and a normally open or back contact for shorting the field. When the voltage exceeds a certain value, the movable contact moves from the forward contact to the back contact to provide a short circuit across the alternator field. This, of course, causes the alternator field to rapidly collapse to provide effective regulator action. However, vibratory devices with back contacts must be precisely constructed because the vibratory contact must be properly related to both the forward and the back fixed contacts, and such devices are expensive and critical of adjustment.

It is an object of the present invention to provide an improved alternator regulator circuit including an electromagnetic relay device having a single contact.

A further object of the invention is to provide an alternator regulator circuit including a simple voltage sensitive relay device having a single contact which is effective to short out the alternator field when the output voltage exceeds a predetermined value.

A feature of the invention is the provision of an alternator regulator circuit including an electromagnetic relay device having normally closed contacts for supplying current to the field winding of the alternator, with the relay device operating when the voltage exceeds a predetermined value to open the contacts, and wherein a rectifier is connected across the alternator field winding with a polarity to be nonconducting when the contacts are closed for normal field current flow, and to conduct when the contacts are open for shorting the field winding to effectively reduce the alternator output.

Another feature of the invention is the provision of an alternator regulator having an electromagnetic relay device with normally closed contacts to energize the field coil of the alternator which open when the output voltage exceeds a predetermined value, and a diode connected across the field coil to short the same when the contacts open, with the diode acting to reduce arcing of the contacts to prolong the life thereof. A small capacitor may be connected across the relay contacts to further reduce arcing.

The invention is illustrated in the drawings wherein:
FIG. 1 is a schematic diagram of the circuit of the regulator in accordance with the invention;
FIG. 2 shows the structure of the relay device and diode of the circuit of FIG. 1; and
FIG. 3 shows an alternate mounting of the diode.

In practicing the invention there is provided a regulator circuit for an alternator-rectifier system which forms the voltage source for an automobile electrical system. The regulator circuit includes an electromagnetic relay device having contacts for supplying current to the field of the alterntaor. The coil of the relay device is connected across the direct current output of the rectifiers and operates to open the contact and thereby de-energize the field when the voltage exceeds a predetermined value. The device has a movable contact which is adjusted to vibrate or move between closed and open position depending upon the voltage at the output of the rectifiers. A rectifier is connected across the alternator field with a polarity so that it is nonconducting when normal alternator output current is applied to the field. However, when the contact opens, the voltage across the field will reverse due to the inductance thereof and the rectifier will conduct to provide a short circuit path across the field. This rapidly reduces the output of the alternator to provide more effective regulation of the voltage of the system, particularly at high alternator speeds. As the reverse voltage across the field is shorted out, the voltage which appears between the contacts as they open is reduced, to effectively reduce arcing across the contacts. A small capacitor may be connected across the relay contacts to further reduce arcing. The relay device requires only one set of contacts which are normally closed, and can therefore be of inexpensive construction and easily adjusted.

In FIG. 1 of the drawing an alternator 10 is shown which includes armature windings 12, 13 and 14 and a field winding 15. The three phase armature windings are shown connected in delta, but a Y-connection can also be used, if desired. The armature windings may be provided on the stator of the alternator, and the field winding provided on a rotor with connections made thereto through slip rings 16. Rectifiers for producing direct current from the alternator output may be mounted directly on the alternator housing. For full wave rectification of the three-phase alternator output, three pairs of rectifiers are required, which are identified as 20, 21; 22, 23; and 24, 25. These rectifiers are connected between ground and the output terminal 28. The field winding 15 is similarly connected between ground and an input terminal 30.

The alternator-rectifier system is useful in an automobile or other automotive vehicle to furnish the direct current energy required to operate the same. In such case the rotor is connected to the engine and is rotated thereby. The output terminal 28 of the alternator rectifier system will be connected to a battery 31 to charge the same, and to the electrical load of the vehicle. This includes the ignition system 32 for the engine which is energized from the battery and/or the alternator through ignition switch 33. The electrical system may also supply accessories of the automobile such as headlights, radio, etc., which are indicated by the load 35. The load 35 is energized through switch 36, which represents a plurality of switches individually controlling various devices.

In order to prevent overcharging of the battery and to maintain the voltage of the automobile electrical system within predetermined limits, it is necessary to control the current applied to the field 15 of the alternator so that the output at terminal 28 is held within such limits. Such regulation is produced by an electromagnetic relay device 40 having a coil 41 and contacts 42. The coil is connected between output terminal 28 and ground and is thereby energized by the output voltage of the alternator rectifier system. The contacts 42 connect the output terminal 28 to the input terminal 30 to energize the field winding 15 from the output of the alternator-rectifier system, or from the battery 31. When the voltage across the winding 41 exceeds a predetermined value, established by proper design and adjustment of the vibratory device, the contacts 42 will open to break the current supply to the field winding 15. This will reduce the alternator output so that the voltage at terminal 28 will drop. This will in turn reduce the voltage across coil 41 so that the contacts 42 will be permitted to close to again energize the field of the alternator. Such vibratory or cycling action will continue, with the percent of the time that the contacts are closed and open depending upon the voltage appearing at the output terminal 28. Because of the rapid cycling of the relay device such systems have been called vibratory or buzzer type regulators.

In accordance with the invention, a rectifier or diode 45 is connected across the field winding 15 of the alternator. In FIG. 1, a system with negative ground is shown with the terminal 28 having a positive potential. In such a circuit the diode has a polarity so that it is not conducting when a positive potential is connected thereto through contacts 42. That is, when the contacts 42 are closed applying current from the output terminal 28 to the field winding 15, the voltage across the diode 45 is of a polarity which holds the diode cut off so that the diode 45 has no effect on the operation of the circuit. However, when the contacts 42 open, the energy stored in the field 15 causes the voltage thereacross to reverse so that the voltage across the diode 45 is of a polarity to cause the same to conduct to short the field winding 15. This causes the magnetic field of winding 15 to rapidly collapse so that voltage of the alternator is rapidly reduced. Accordingly, the opening of the contacts 42 is effective immediately to reduce the output of the alternator for very effective regulating action.

The diode 45 is also effective to reduce the arcing at the contacts 42 when the contacts open. This is because the reversal of the voltage across the winding 15 produces a large voltage difference between the contacts 42 when they open. However, the shorting of the winding 15 reduces this voltage difference and this reduces the arc.

In FIG. 1, a capacitor 46 is shown connected across the relay contacts 42. This may be used to further reduce arcing of the contacts as when the contacts open the capacitor becomes a short circuit. The capacitor charges to the voltage across the contacts and then discharges when the contacts close.

Although the electromagnetic relay device 40 in FIG. 1 may be of standard construction, such a device is illustrated in FIG. 2. This device includes a base 48 which may be connected to a ground potential. A bracket 50 of magnetic material is insulated from the base 48 and a core 51 is secured thereto on which the coil 41 is positioned. The magnetic field is completed through the core 51, bracket 50 and armature 52. The armature 52 has a rear extension 53 which is held on the top of the bracket 50 by spring 54. The spring 54 is connected to an arm 55 secured to bracket 50, and the tension thereof may be controlled by adjustment of the screw 56. The screw 56 is threaded into arm 57 so that it is operative to bend arm 55, and the tension of the spring 54 can be adjusted. Also secured to the armature 52 is a contact arm 59 on which a movable contact 60 is supported. This contact is normally in engagement with fixed contact 61 supported on arm 62. The arm 62 is adjustably positioned on insulating support 63 by screw 64. By adjustment of the position of the arm 62, the air gap 65 between the armature 52 and the core 51 may be set at the desired length.

The diode 45 of the regulator circuit may be mounted on the base 48 of the relay device so that a unitary regulator structure is provided. The diode may be formed of a semiconductor die 70 which may be made of silicon. This is soldered directly to the base 48 as shown in FIG. 2. A cup 71 may be provided about the die and secured to the base 48. A lead 72 is soldered to the die and the whole assembly then sealed with glass or epoxy. A glass seal may be adequate without the cup. The die is selected to provide the desired polarity with respect to the grounded base. The lead 72 of the diode is connected to the arm 62 and to the lead 67 which is adapted to be connected to the terminal 30 of FIG. 1. Connection is made from input lead 66 to the coil 41 and to the magnetic structure of the vibratory device to provide a connection to contact 60. The other terminal of winding 41 is grounded to the base 48.

When the coil 41 is energized by a predetermined alternator output voltage, the armature 52 will be attracted to the core 51 to open the contacts 60, 61. These are the contacts identified as 42 in the circuit of FIG. 1. As previously stated, the unit will tend to vibrate because opening of the contacts 60 and 61 will reduce the alternator output so that the voltage applied to the coil 41 is reduced, and the armature 52 is thereby released. However, if the battery 31 is substantially discharged, as when starting an automobile in cold weather, the contacts 60 and 61 may remain closed for a substantial time until the battery voltage is built up.

In FIG. 3 there is illustrated an alternate mounting of the diode on the relay structure. The base 48' has an extruded opening 73 formed therein. A diode 45' provided as a complete component may be frictionally held in the opening 73, with the housing providing ground connection to the base 48'. The terminal 74 of the diode may be connected to the arm 62 as in the structure of FIG. 2.

The diode 45 may be of extremely inexpensive construction as its current carrying requirements are low. In alternator-rectifier systems now used, the power diodes 20 to 25 inclusive are of the silicon type. In the construction of such diodes, chips of silicon are produced which may be used to form the rectifying element of low capacity diodes. Since the capacity requirement of the diode 45 is small, this diode can be constructed from such a chip and it is therefore inexpensive.

The regulator circuit and unit described provides effective regulation of an alternator as may be used with rectifiers to form the electrical source for an automobile. This may also be used in any other alternator system operating over a wide range of speeds and wherein effective regulation is required. The voltage sensitive relay device in combination with the diode immediately reduces the alternator output so that the regulating action is highly effective. The relay device is of inexpensive construction since only one fixed contact is required and the movable contact need be set for operation with respect to only this one contact. The diode must handle only relatively small current and can therefore be cheaply constructed.

I claim:

1. A regulator circuit for an alternator-rectifier direct current source having an output terminal for producing a potential with respect to a reference potential, and which includes a field winding connected between an input terminal and the reference potential for controlling the voltage at the output terminal, said regulator circuit including voltage sensitive relay means having a pair of normally closed contacts and coil means connected between the output terminal and the reference potential for causing said contacts to open when the voltage at the output terminal exceeds a predetermined value, means including said contacts for connecting the output terminal to the input terminal to apply current to the field winding, rectifier means connected between the input terminal and the reference potential, said rectifier means being connected with a polarity to be nonconducting when said contacts are closed and the potential from the output terminal is applied thereto, and to be conducting when the contacts open and the polarity at the input terminal reverses to thereby connect the input terminal to the reference potential through said rectifier means to reduce the alternator output, and capacitor means connected across said contacts for reducing the arc produced thereacross by the voltage across said rectifier means when said contacts open.

2. A regulator system for an alternator-rectifier direct current source providing an output voltage between an output terminal and a reference point, and which includes a field winding connected between an input terminal and the reference point for controlling the voltage at the output terminal, said regulator system including in combination, a conducting base member connected to the reference point, an electromechanical device supported on said base member and having a fixed contact and a movable contact, and means for supporting said movable contact including means tending to hold said movable contact in engagement with said fixed contact, and a magnetic structure having a coil producing a field for moving said movable contact away from said fixed contact, means connecting said coil to said base member and to the output terminal, whereby said movable contact is moved from said fixed contact when the voltage at the output terminal exceeds a predetermined value, means including said contacts for connecting the output terminal to the input terminal to apply current to the field winding, rectifier means having one terminal supported in conductive relation on said base member and having a second terminal connected to the input terminal, said rectifier means being connected with a polarity to be nonconducting when said contacts are closed and the potential from the output terminal is applied thereto, and to be conducting when the contacts are open and the potential across the field reverses, said rectifier means when conducting connecting the input terminal of the field winding to the reference potential and thereby reducing the alternator output, said rectifier means when conducting reducing the potential between said contacts, and capacitor means connected between said fixed contact and said movable contact and cooperating with said rectifier means to reduce arcing between said contacts.

3. A regulator circuit for an alternator-rectifier direct current source providing an output voltage between an output terminal and a reference point, and which includes a field winding connected between an input terminal and the reference point for controlling the voltage at the output terminal, said regulator circuit including in combination, a conducting base member connected to the reference point, an electromechanical device supported on said base member and having a fixed contact and a movable contact, and means for supporting said movable contact including means tending to hold said movable contact in engagement with said fixed contact, and a magnetic structure having a coil producing a field for moving said movable contact away from said fixed contact, means connecting said coil to said base member and to the output terminal, whereby said movable contact is moved from said fixed contact when the voltage at the output terminal exceeds a predetermined value, means including said contacts for connecting the output terminal to the input terminal to apply current to the field winding, and rectifier means having one terminal supported in conductive relation on said base member and having a second terminal connected to the input terminal, said rectifier means being connected with a polarity to be nonconducting when said contacts are closed and the potential from the output terminal is applied thereto, and to be conducting when the contacts are open and the potential across the field reverses, said rectifier means when conducting connecting the input terminal of the field winding to the reference potential and thereby reducing the alternator output, said rectifier means when conducting reducing the potential between said contacts.

References Cited in the file of this patent

UNITED STATES PATENTS

| | | |
|---|---|---|
| 1,870,064 | Nickle | Aug. 2, 1932 |
| 2,011,395 | Cain | Aug. 13, 1935 |
| 2,614,241 | Diamantides | Oct. 14, 1952 |
| 2,668,271 | Harmon | Feb. 2, 1954 |
| 2,746,006 | Hill | May 15, 1956 |
| 2,848,679 | Hochstetter | Aug. 19, 1958 |